United States Patent [19]

Tempka

[11] 3,962,646

[45] June 8, 1976

[54] SQUELCH CIRCUIT FOR A DIGITAL SYSTEM

[75] Inventor: John A. Tempka, Glenview, Ill.

[73] Assignee: Motorola, Inc., Chicago, Ill.

[22] Filed: Nov. 4, 1974

[21] Appl. No.: 520,324

Related U.S. Application Data

[63] Continuation of Ser. No. 287,121, Sept. 7, 1972.

[52] U.S. Cl. ........................... 325/478; 178/69.5 R; 179/15 BF; 179/15 BS; 325/31; 325/41; 325/322; 340/146.1 AB; 340/146.1 D; 340/146.1 E
[51] Int. Cl.² ...................... H04B 1/10; H04B 3/20; H04J 3/06
[58] Field of Search ............... 179/175.3 R, 15 BS, 179/15 AD, 15 AE, 15 BF; 178/69 R, 69 A, 69 G, 69.5; 325/2, 31, 41, 42, 65, 322–324, 478; 328/99, 119, 120; 340/146.1 AB, 146.1 C, 146.1 E, 146.1 D

[56] References Cited
UNITED STATES PATENTS

| | | | |
|---|---|---|---|
| 3,161,732 | 12/1964 | Martin et al. | 179/175.2 |
| 3,259,695 | 7/1966 | Murakami | 179/15 |
| 3,386,079 | 5/1968 | Wiggins | 340/146.1 |
| 3,390,233 | 6/1968 | Brothman et al. | 179/2 |
| 3,444,321 | 5/1969 | Pantos | 178/69 |
| 3,593,279 | 7/1971 | Pumpe | 340/146.1 |
| 3,597,539 | 8/1971 | Clark | 178/69.5 |
| 3,652,988 | 3/1972 | Yamamoto et al. | 340/146.1 AB |
| 3,696,210 | 10/1972 | Peterson et al. | 179/15 BF |
| 3,702,379 | 11/1972 | Peterson et al. | 179/15 BS |
| 3,772,596 | 11/1973 | Edwards | 325/13 |
| 3,786,187 | 1/1974 | De Vita et al. | 178/69 A |
| 3,830,980 | 8/1974 | Peron et al. | 179/15 BS |
| 3,859,468 | 1/1975 | Smith et al. | 179/15 AL |
| 3,865,981 | 2/1975 | Welch et al. | 178/69.5 |

*Primary Examiner*—Robert L. Griffin
*Assistant Examiner*—Marc E. Bookbinder
*Attorney, Agent, or Firm*—James W. Gillman; Eugene A. Parsons

[57] ABSTRACT

A digital system for receiving digital messages transmitted in a polybinary code having a squelch circuit for inhibiting operation of the system during improper operation, said squelch system including a pair of NOR gates either of which provides an inhibit signal at the output thereof upon receiving a low or zero signal at any of thirteen inputs thereto. Six of the inputs are connected to a word detector which provides a zero output whenever any one of six words, which cannot be transmitted, are received. A seventh input is activated whenever input signals exceed a predetermined level and an eighth input is activated when a carrier oscillator drops out of synchronization. One of two other inputs are activated whenever a triplet of bits including two ones of the same polarity with a zero or one between is received. One input is activated when frame pulses are missing and another input is activated when additional frame pulses are present and the final input is activated whenever bit timing pulses are missing.

8 Claims, 7 Drawing Figures

SQUELCH CIRCUIT FOR A DIGITAL SYSTEM

This is a continuation of application Ser. No. 287,121, filed Sept. 7, 1972.

BACKGROUND OF THE INVENTION

1. Field of the Invention

The present improved squelch system is especially useful with digital systems such as data transferring systems. Data transferring systems are often required which can communicate data from a data source to a data utilization device located many miles apart and which can discriminate against any errors in the data. Such data transferring systems are required by electric utility companies, for example, to exchange information between protective relays relating to electrical quantities being measured at selected points along power transmission lines. This information is utilized to trip enormous circuit breakers controlled by the protective relays to thereby disconnect a particular transmission line having a fault thereon from a power distribution system, thus, protecting the line, equipment and lives associated therewith. Since it is important that such a power line not be inadvertently connected or disconnected, it is essential that the data transferring system used therewith have a high degree of operational reliability, security against false outputs, and speed of information exchanged.

Data transferring systems, such as those described above, are described in detail in the copending application entitled Data Transferring System Utilizing Frame and Bit Timing Recovery Technique, Ser. No. 61,730, filed Aug. 6, 1970, now U.S. Pat. No. 3,702,379 and in the copending application entitled Data Transferring System Utilizing A Monitor Channel and Logic Circuitry To Assure Secure Data Communication, Ser. No. 61,729, filed Aug. 6, 1970, now U.S. Pat. No. 3,696,210.

2. Description of the Prior Art

Generally, in prior art devices, a monitor channel is included, which channel is adapted to receive a predetermined message transmitted prior to the messages for each of the other channels. If the proper monitor channel message is received the squelch circuit does not operate since it is an indication that all of the apparatus is working correctly. However, many failures can occur in this system, since noise and other interference can occur during the transmission of signals on the other channels and not during the monitor channel transmission. Further, while most of the apparatus is common to all of the channels, each channel has some apparatus which is peculiar to that channel and, therefore, might fail. Thus, while the monitor channel system prevents a great many false trips, many false trips can still occur.

SUMMARY OF THE INVENTION

The present invention pertains to an improved squelch circuit for a digital system such as a data transferring system, wherein logic circuitry is utilized to provide a signal to inhibit or reset shift registers and other output circuits upon the occurrence of any one of the following: reception of any one of the following eight words — 0010, 1001, 0100, 1101, 0110, 1011, 1010, or 0101; signals having an amplitude exceeding a predetermined level; loss of lock in the carrier phase locked loop; missing frame timing pulses; additional frame timing pulses; or missing bit timing pulses. Depending upon the security desired, various combinations or all of the above might be utilized.

It is an object of the present invention to provide an improved squelch circuit for digital systems.

It is a further object of the present invention to provide an improved squelch circuit wherein the specific channel being utilized is also monitored for errors or untransmitted signals.

It is a further object of the present invention to provide an improved squelch circuit which checks a plurality of characteristics of each frame and bit to prevent improper operation of the attached digital system.

These and other objects of this invention will become apparent to those skilled in the art upon consideration of the accompanying specification, claims and drawing.

BRIEF DESCRIPTION OF THE DRAWINGS

Referring to the drawings, wherein like characters indicate like parts throughout the Figures.

DESCRIPTION OF THE PREFERRED EMBODIMENT

Figure 1:
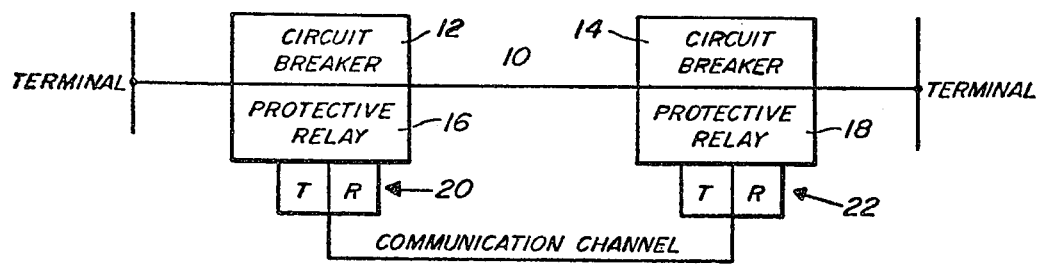
FIG. 1 is a block diagram illustrating a power transmission, circuit breakers, protective relays, and a data transferring system operating over a communications link.

To facilitate an understanding of one embodiment of the improved squelch system, a typical digital system, including one possible embodiment thereof, will first be described. Referring to FIG. 1, electrical utility companies utilize power transmission lines, represented by line 10, for transferring electrical power at voltages up to 750,000 volts over distances of many miles. To protect line 10, and the equipment and lives associated therewith, enormous circuit breakers, for instance 12 and 14, are located at strategic points in the power distribution system. Circuit breakers 12 and 14 are controlled by fault sensing, protective relays 16 and 18, respectively, which continuously monitor electrical quantities associated with the lines to determine whether the power system is performing properly and if not, to determine where the trouble is located. If a fault occurs on line 10, information is relayed or transferred through interfacing communication equipment 20 and 22 which may operate over a microwave link. Communication equipment 20 and 22 is coupled with respective relays 16 and 18, to appropriate circuit breakers which open to isolate the rest of a power system from line 10 and to remove power going to line 10.

Communications equipment 20 and 22 each includes a transmitter-encoder, labeled T, and a receiver-decoder, labeled R, connected by way of a communications channel which may be either a transmission line or a microwave link. It is important that this data transferring system includes security for discriminating against false control signals and that the signal processing time be minimum for the available bandwidth.

Figure 2:
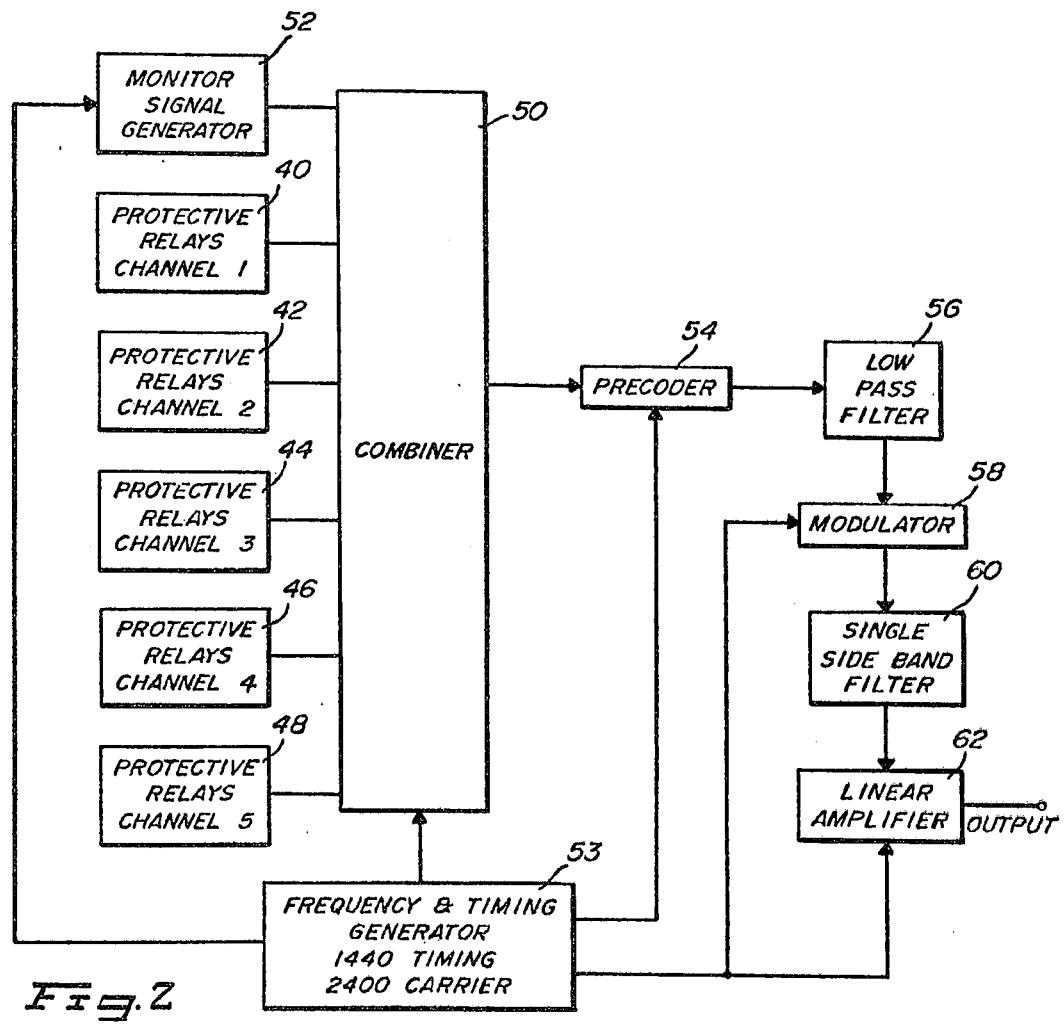
FIG. 2 is a block diagram of a transmitter-encoder for the data transferring system of FIG. 1.

FIG. 2 is a block diagram of a transmitter-encoder which derives data from a plurality of data sources or protective relays 40, 42, 44, 46 and 48, which are similar to relays 16 and 18 of FIG. 1 but which respectively utilize channel 1, channel 2, channel 3, channel 4 and channel 5 of the data transferring system, which channels are each similar to the communications channel described in conjunction with FIG. 1. Combiner 50 and monitor signal generator 52, which utilize channel 0, are both controlled by frequency and timing generator 53. Monitor signal generator 52 develops a pulse train or known format of known pulse code which, after it has been demodulated at the receiver, is utilized as one test to determine whether the data transferring system is operating error-free. This is one of the prior art error detecting systems and is described in detail in the above-described copending applications. Combiner 50 sequentially samples the parallel outputs of monitor signal generator 52 and protective relays 40, 42, 44, 46 and 48 to develop a serial binary data stream at its output.

Precoder 54 is connected to the output of combiner 50 and a 1440 Hz timing signal from the generator 53 and converts the binary bit stream into a second binary bit stream preparatory to conversion into a polybinary or ternary signal. Low pass filter 56, which is connected to the output of precoder 54, removes the high frequency components above a predetermined frequency from the binary bit stream thereby reducing the width of its frequency spectrum. Modulator 58, which is connected both to the output of the low pass filter 56 and to the carrier frequency (2400 Hz) output of frequency and timing generator 53, amplitude modulates the carrier signal with the output of filter 56. The output of modulator 58 is connected to single side band filter 60 which selects the lower side band of the amplitude modulated signal. The signal provided by the single side band filter 60 is a ternary wave or three level analog signal which is supplied, along with the 2400 Hz carrier from the generator 53, to a linear amplifier 62. The combined or composite output signal of linear amplifier 62, which includes the carrier and correlatively encoded data, is communicated to a receiver-decoder. The above combined output signal can be transmitted either over channels such as a "voice band" transmission cable, having a bandwidth from 300–3000 Hz, or over multiplex and/or microwave equipment.

Figure 3:
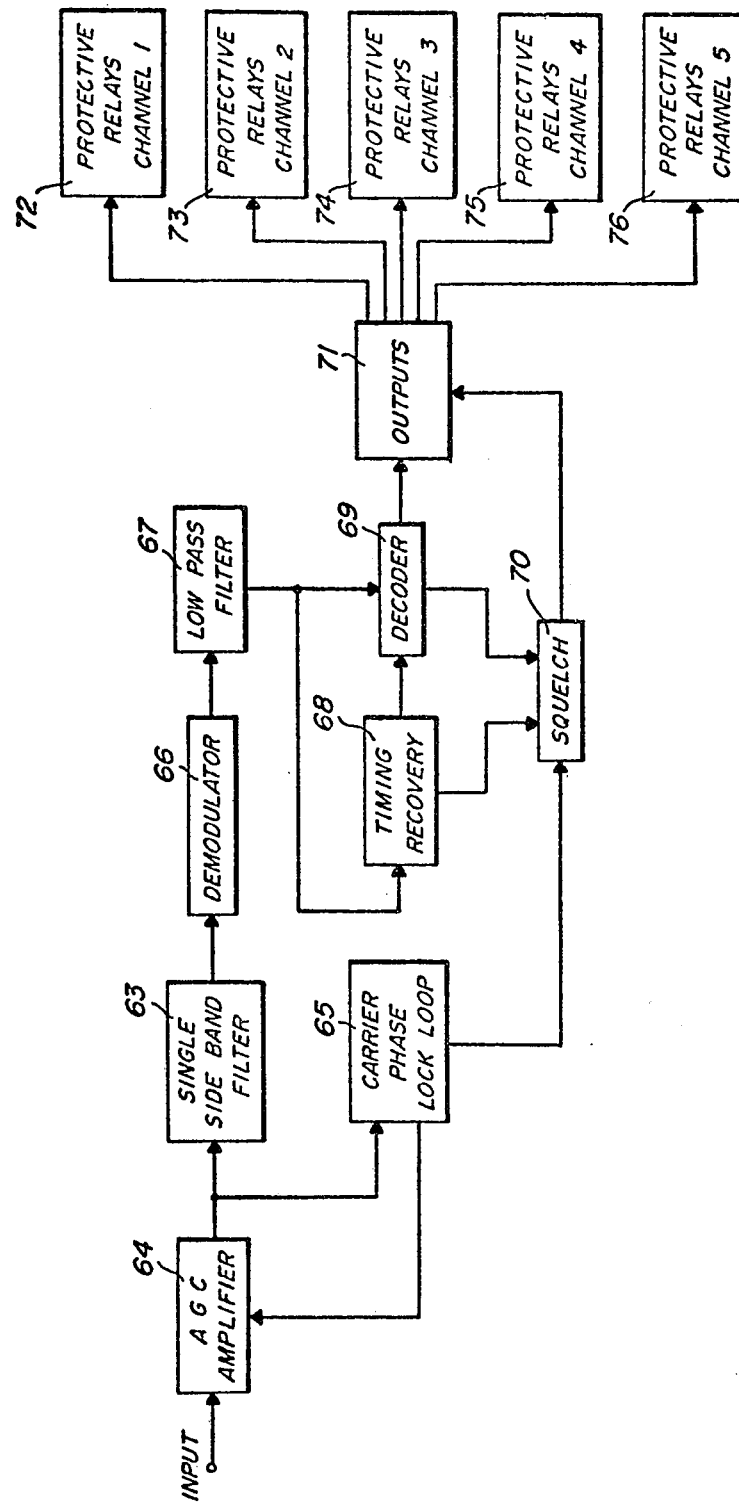
FIG. 3 is a block diagram of a receiver-decoder, incorporating the improved squelch circuit, for the data transferring system of FIG. 1.

FIG. 3 is a block diagram of the receiver-decoder of the information transferring system. The composite output of linear amplifier 62 (FIG. 2) which might be undesirably shifted in frequency is amplified by automatic gain control (AGC) amplifier 64 of the receiver. The input of a carrier phase lock loop, or frequency selective circuit, 65 is connected to the output of AGC amplifier 64 and its outputs are connected to the gain control element of amplifier 64 and to one of the inputs of a balanced demodulator 66. An AGC signal, developed by the carrier phase lock loop 65, is applied from an output thereof to control the gain of amplifier 64 so that the amplitude of the composite signal at the output of amplifier 64 is a known predetermined value. Another output having a frequency equal to the shifted carrier signal of circuit 65 is applied through a single side band filter 63 to the input of balanced demodulator 66. The output of demodulator 66 is connected to the input of a low pass filter 67 which selects out the lower sideband of the mixing product of the carrier signal and the data frequency band, which includes frequencies between zero and 1440 Hz and which contains the timing signal and the filtered, ternary signal. One output of the low pass filter 67 is connected to the input of a timing recovery block 68 which utilizes the difference of the carrier and pilot frequencies to reconstruct the frame and bit timing pulses. The filtered ternary signal and the bit timing pulses are also applied to a decoder 69 which includes a slicer or full wave rectifier for transforming the ternary signal back into the serial data information sequence, and a bit separator routes or separates the serial bits into parallel paths leading to the improved squelch circuit 70 and through output switching circuit 71 to protective relays 72–76. The squelch circuit 70 also receives input signals from the decoder 69, the timing recovery circuit 68 and the carrier phase lock loop 65.

Figure 4:
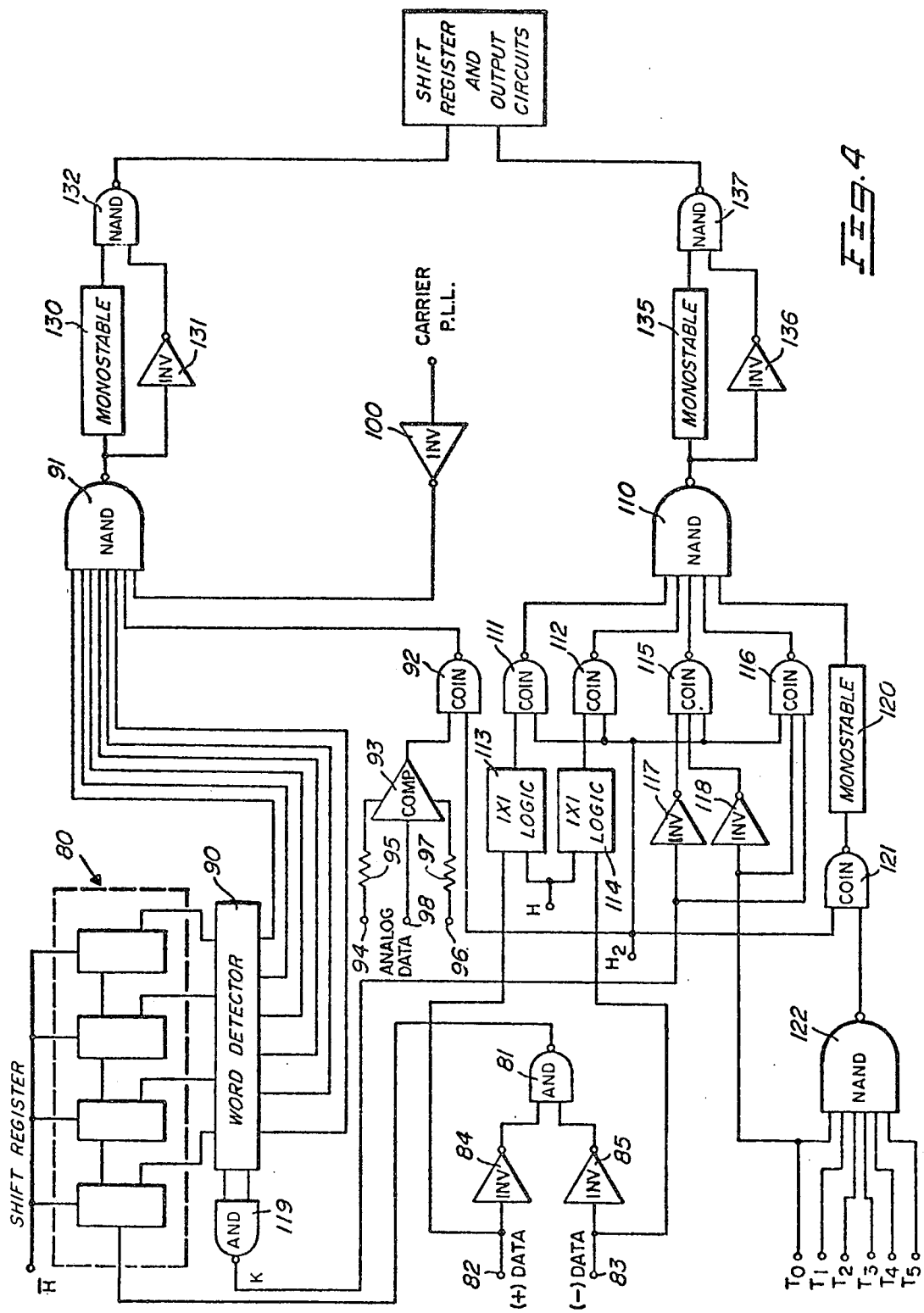
FIG. 4 is a block diagram of an embodiment of the improved squelch circuit incorporated in the receiver-decoder of FIG. 3.

Referring to FIG. 4, a more detailed block diagram of the squelch circuit 70 is illustrated. A shift register 80, comprised of four 5 bit registers, is connected to receive a binary train of pulses at the input thereof from an AND circuit 81. The AND circuit 81 receives input data from the positive and negative slicers, on terminals 82 and 83 respectively, by way of inverters 84 and 85. The shift register 80 also receives timing pulses, designated $\bar{H}$, which are inverted bit timing pulses. The $\bar{H}$ timing pulses are received from the timing recovery circuit 68 (see FIG. 3) and the plus and minus data signals from the plus and minus slicers applied to the terminals 82 and 83 are received from the decoder 69 (see FIG. 3). An output from each of the four registers in the shift register 80 is applied to a word detector 90.

The operation of the shift register 80 is such that the signals applied to the word detector 90 consist of four consecutive bits from a single channel followed by four consecutive bits from the next channel, etc. The word detector 90 then compares the four consecutive bits in a particular channel to six combinations of bits, or words, which are not transmitted and, therefore if they appear, indicate an error in the system. The six consecutive bits or words which are not transmitted are — 0010, 1001, 0100, 1101, 0110, and 1011. If any one of these words appears it is an indication of a spurious signal and the word detector 90 provides a zero or low signal at one of the six outputs provided for the six words described above. The six outputs of the word detector 90 are connected to six inputs of a NAND gate 91. The six outputs of the word detector 90 are normally high or one and upon the application of any one of the six unacceptable words to the word detector 90 an appropriate one of the six outputs drop to a low or zero, which low is applied to the NAND gate 91. The NAND gate 91 has eight inputs thereto all of which are normally high and upon any one of the inputs dropping to zero the normally low output rises to a one or high.

A seventh input of the NAND gate 91 is connected to an output of a coincidence gate 92. One input of the coincidence gate 92 is connected to receive delayed bit timing pulses designated $H_2$. These pulses are provided from the timing recovery circuit 68 (FIG. 3). The second input of the coincidence gate 92 is connected to the output of a comparator 93. A first input terminal 94 is connected to the comparator 93 through a resistor 95 and a second terminal 96 is connected to the comparator 93 through a resistor 97. An input terminal 98 of the comparator 93 is connected to receive the ternary analog data signal from any suitable source in the system, such as the decoder 69 (FIG. 3) at the input of the slicers. The terminals 94 and 96 are adapted to have positive and negative reference voltages applied thereto which set levels of operation for the comparator 93. When the analog data signal applied to the terminal 98 exceeds either of the reference signals applied to the terminals 94 and 96, the portion of the signal exceeding the reference level appears at the output of the comparator 93 and is applied to the input of the coincidence gate 92. If the excessively high portion of the analog data occurs at the same time as an $H_2$ pulse the coincidence gate 92 supplies a low or zero to the seventh input of the NAND gate 91 and a one appears at the output thereof.

The eighth input of the NAND gate 91 is connected to the output of an inverter 100 the input of which is connected to the carrier phase lock loop 65 (FIG. 3). The connection of the inverter 100 to the phase lock loop 65 is such that a signal is applied to the input of the inverter 100 whenever the phase lock loop 65 drops a predetermined amount out of phase. The amount of allowable phase difference between the received carrier and the internal oscillator is determined by the effect of the phase difference on the remaining circuits. When the phase differs sufficiently to provide a signal at the input of the inverter 100, a zero or low is produced at the output thereof which is applied to the eighth input of the NAND gate 91 to produce a one at the output thereof. During normal operation the inverter 100 provides a high or a one at the output thereof.

A second NAND gate 110 has five inputs and an output and operates in a fashion similar to the NAND gate 91. NAND gates 91 and 110 may be incorporated into a single unit if desired, but are illustrated as two circuits in the present embodiment for convenience of illustration. The first input of the NAND gate 110 is connected to the output of a coincidence gate 111 and the second input of the NAND gate 110 is connected to the output of a second coincidence gate 112. One input of each of the coincidence gates 111 and 112 is connected to receive the delayed bit timing pulses $H_2$. The other input of the coincidence gate 111 is connected to the output of a logic module 113. The other input of the coincidence gate 112 is connected to the output of a logic module 114. Each of the logic modules 113 and 114 has an input connected to receive bit timing pulses, H. The logic module 113 also has an input connected to the terminal 82 to receive data signals from the positive slicer in the decoder 69 (FIG. 3). The logic module 114 also has an input connected to the terminal 83 to receive data signals from the negative slicer in the decoder 69.

The operation of the logic module 113 is such that whenever a triplet of bits including two positive ones spaced apart by a zero or one appears at the input thereof a signal is applied to the coincidence gate 111 which produces a zero at the output thereof. The operation of the logic module 114 is such that whenever a triplet of bits including two negative ones spaced apart by a zero or one appears at the input thereof a signal is applied to the coincidence gate 112 producing a zero at the output thereof. It should be understood that in ternary type signals triplets including two ones of the same polarity spaced apart by a zero or one are never transmitted and if such a signal occurs in the receiver an error has occurred. In each of the above circuits bit timing pulses, regular (H), inverted ($\overline{H}$), or delayed ($H_2$) are utilized in conjunction with the data being checked to insure that the timing and, therefore, the position of the bit of data is correct, in accordance with standard digital procedures.

Figure 5:
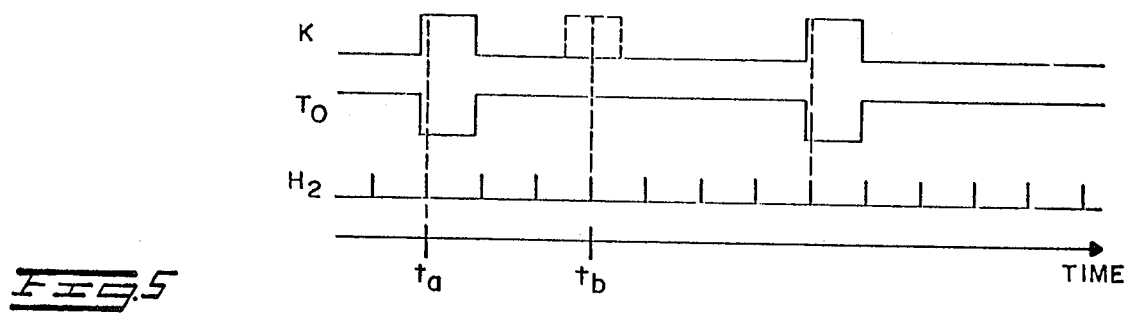
FIG. 5 is a timing diagram illustrating the time relationship of some wave forms applied to a portion of the circuitry of FIG. 4.

The third input of the NAND gate 110 is connected to the output of a coincidence gate 115. The fourth input of the NAND gate 110 is connected to the output of a coincidence gate 116. Each of the coincidence gates 115 and 116 have an input connected to receive the delayed bit timing pulses $H_2$. Second and third inputs of the coincidence gate 115 are connected to outputs of inverters 117 and 118, respectively. The input of the inverter 117 is connected to the output of an AND gate 119. The AND gate is connected to the word detector 90 to receive frame timing pulses, K, separated from the transmitted ternary analog signal by the operation of the shift register 80 and the word detector 90 in a well known manner. The frame timing pulses, K, from the AND gate 119 are also applied to a second input of the coincidence gate 116. The input of the inverter 118 is connected to receive frame timing pulses which are manufactured within the system by a circuit (not shown) which is triggered with the transmitted frame timing pulse. The manufactured frame timing pulses are designated $T_0$ and are also applied to a third input of the coincidence gate 116. The delayed bit timing pulses, $H_2$, are relatively fast positive going pulses which are delayed with respect to the desired transitions of the frame timing pulses and the manufactured frame timing pulses ($T_0$). The frame timing pulses, K, are also positive going pulses and the manufactured frame timing pulses, $T_0$, are negative going pulses which coincide with the frame timing pulses. Referring to FIG. 5 the signals K, $T_0$, and $H_2$ as they appear at the inputs of coincidence gate 116 can be seen, with an additional or spurious pulse shown in dotted in the K signal. The $T_0$ signal is high, except when pulses appear, and the frame timing signals K and $H_2$ signals are high when pulses appear, so that during normal operation the output of coincidence gate 116 will always be a high. However any additional or spurious pulses which appear in the frame timing signal out of coincidence with the $T_0$ signal, as for example at time $t_b$ in FIG. 5, will cause all of the inputs of the coincidence gate 116 to be high which will produce a low at the output thereof and, consequently, a one or high at the output of the NAND gate 110.

Figure 6:
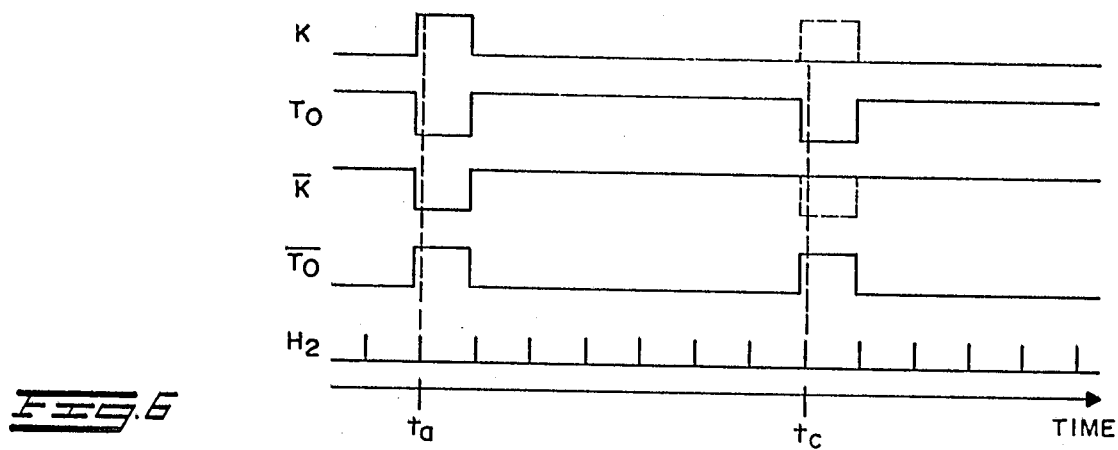
FIG. 6 is a timing diagram illustrating the time relationship of some wave forms applied to another portion of the circuitry of FIG. 4.

Both the frame timing signal and the $T_0$ signal are inverted prior to application to the coincidence gate 115 so that the frame timing signal, $\overline{K}$, is normally high, except when pulses appear, and the $\overline{T}_0$ and $H_2$ signals include positive going pulses in coincidence with the frame timing pulses, $\overline{K}$, so that during normal operation the output of coincidence gate 115 will always be a high. Referring to FIG. 6 the signals K and $T_0$ as they appear at the inputs of the inverters 117 and 118 and the signals $\overline{K}$, $\overline{T}_0$ and $H_2$ as they appear at the inputs of coincidence gate 115 can be seen, with a missing pulse shown in dotted in the K and $\overline{K}$ signals. Thus, as can be seen in FIG. 6 if a frame timing pulse is missing all three of the signals applied to the coincidence gate 115 will be high and the output thereof will be low so that the output of the NAND gate 110 will be high. The coincidence gates 115 and 116, therefore, provide an indication of additional received frame timing pulses or missing received frame timing pulses.

Figure 7:
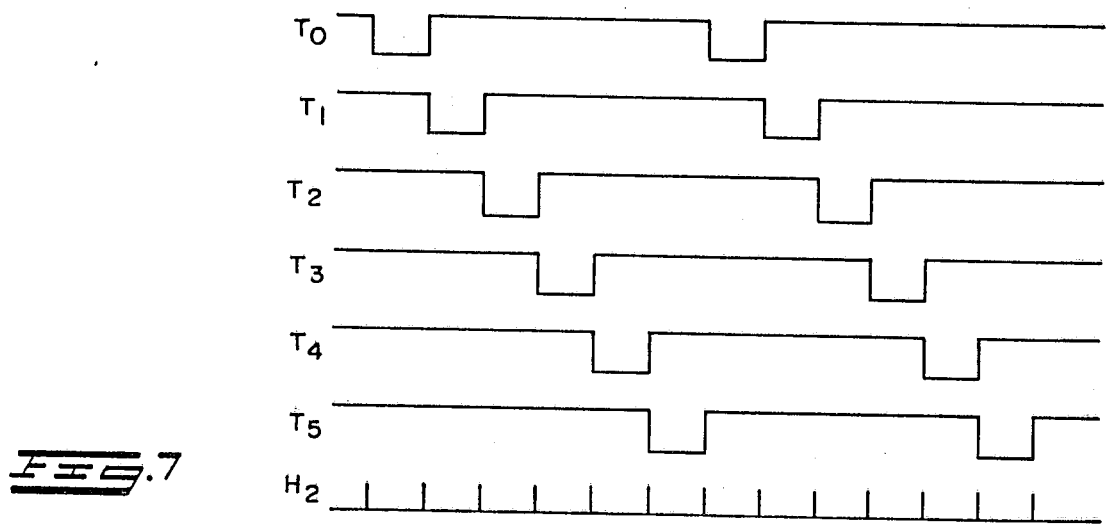
FIG. 7 is a timing diagram illustrating the time relationship of some wave forms applied to another portion of the circuitry of FIG. 4.

The final or fifth input of the NAND gate 110 is connected to a monostable circuit 120 the input of which is connected to the output of a coincidence gate 121. One input of the coincidence gate 121 has delayed bit timing pulses ($H_2$) applied thereto and a second input is connected to the output of a NAND gate 122. The NAND gate 122 has six inputs applied thereto $T_0$, $T_1$, $T_2$, $T_3$, $T_4$ and $T_5$. $T_0$ is the manufactured frame timing signal, $T_1$ is a similar signal wherein the pulses are triggered by the trailing edge of the pulses in the $T_0$ signal, $T_2$ is a similar signal wherein the pulses are triggered by the trailing edge of the $T_1$ pulses, etc., as illustrated in FIG. 7. Thus, $T_0$ occurs in coincidence with a first $H_2$ pulse, $T_1$ occurs in coincidence with a second $H_2$ pulse, $T_2$ occurs in coincidence with a third $H_2$ pulse, etc. The NAND gate 122 operates in a fashion similar to the NAND gates 91 and 110 in that the low or negative going pulses in the $T_0$, $T_1$, . . . $T_5$ signals produce ones at the output thereof which, in conjunction with the positive going $H_2$ bit timing pulses produce a zero at the output of the coincidence gate 121. The monostable 120 has a normally high output and is triggered by a positive going transition (zero to a one) to produce a zero at the output. The zero from the coincidence gate 121 is applied to the input of the monostable 120 which retains a one or high pulse at the output in response thereto. Whenever an $H_2$ pulse is missing the zero at the input of the coincidence gate 121 produces a one at the output thereof which produces a zero or low at the output of the monostable 120 and at the input of the NAND gate 110.

The output of the NAND gate 91 is applied to the input of a monostable 130 and to the input of an inverter 131. The output of the monostable 130 and the output of the inverter 131 are each applied to separate inputs of a NAND gate 132. The NAND gate 132 operates similar to the NAND gates 91 and 110. The monostable 130 has a normally high output which goes low upon the application of a positive transition to the input thereof. The output of the NAND gate 91 is normally low so that the output of the inverter 131 is normally high which, in cooperation with the normally high output of the monostable 130 produces a low signal at the output of the NAND gate 132. Whenever a low or zero is applied to the NAND gate 91 the output thereof goes high and this positive transition applied to the monostable 130 causes the triggering thereof and the output goes low. Also, the high signal applied to the inverter 131 produces a low output and either of these lows applied to the NAND gate 132 produces a high at the output thereof. This high signal is applied to the shift register and output circuit to inhibit or reset the registers. Since the monostable 130 only triggers on positive transitions and a predetermined time after being triggered returns to its normal state, any continuing error which produces a continuous low at the output of the NAND gate 91 will not affect the monostable 130 after the initial change. Therefore, the inverter 131 is incorporated in parallel with the monostable 130 to preserve DC signals since the output thereof will remain low as long as the input is high.

Similar to the circuitry described above in conjunction with the NAND gate 91, the output of the NAND gate 110 is applied to the input of a monostable 135 and the input of an inverter 136. The outputs of the monostable 135 and inverter 136 are applied to separate inputs of a NAND gate 137, the output of which is connected to shift register and output circuits to inhibit or reset the registers upon the occurrence of an error or improper signal. Thus, any error or improper signal that occurs in the timing or data signals throughout the system produces a squelch signal which removes information from the shift register and output circuits to prevent the inadvertent operation of the protective relays. Only when all of the data and timing signals are proper can a signal be utilized to operate the protective relays. Therefore, the security and the reliability of the system is greatly improved.

While we have shown and described a specific embodiment of this invention, further modifications and improvments will occur to those skilled in the art. We desire it to be understood, therefore, that this invention is not limited to the particular form shown and we intend in the appended claims to cover all modifications which do not depart from the spirit and scope of this invention.

I claim:

1. An improved squelch circuit for a digital system designed to receive transmitted acceptable digital messages, including a continuous train of regularly spaced frame timing pulses and excluding a plurality of predetermined unacceptable messages, and operate in response thereto comprising:
   a. gate means having a plurality of inputs and at least one output for providing an inhibit signal at the output in response to a predetermined signal on at least one of said inputs;
   b. the output of said gate means being connected to said digital system to inhibit the operation of said digital system in response to said inhibit signal;
   c. logic circuitry connected to a plurality of said inputs and to said digital system for receiving the transmitted digital messages and operating to provide said predetermined signal on one of the plurality of said inputs in response to the reception of a spurious digital signal which corresponds with any of the plurality of predetermined, unacceptable digital messages; and
   d. said logic circuitry including further means connected to said digital system for receiving the continuous train of regularly spaced frame timing pulses and providing said predetermined signal on one of the plurality of inputs in response to missing frame timing pulses in said continuous train of frame timing pulses and in response to additional frame timing pulses in said continuous train of frame timing pulses.

2. An improved squelch circuit as set forth in claim 1 wherein the logic circuitry further includes means connected to said digital system for receiving a continuous train of regularly spaced bit timing pulses and providing said predetermined signal on one of the plurality of inputs of the gate means in response to missing bit timing pulses.

3. An improved squelch circuit as set forth in claim 1 including in addition peak noise circuit means connected to one of the inputs of the gate means and to the digital system for receiving the transmitted digital messages, said peak noise circuit means providing the predetermined signal to the gate means when the amplitude of the transmitted digital message exceeds a predetermined level.

4. An improved squelch circuit as set forth in claim 1 wherein the digital system includes oscillatory means connected to receive a carrier of the transmitted digital message and providing a carrier frequency substantially at the same frequency and in phase with the carrier of the transmitted digital message and the squelch circuit includes means connected to one input of the gate means and to the oscillatory means for providing the predetermined signal to the gate means upon a substantial change of phase of said oscillatory means relative to the transmitted carrier.

5. An improved squelch circuit as set forth in claim 1 wherein the transmitted digital messages are polybinary signals and the logic circuitry includes means for providing the predetermined signal to the gate means upon receipt of a binary one of either polarity, followed by a binary zero, followed by a binary one of the same polarity as the first binary one.

6. An improved squelch circuit for a digital system designed to receive transmitted digital messages, including a continuous train of regularly spaced bit timing pulses and excluding a plurality of predetermined unacceptable messages, and operate in response thereto comprising:
   a. gate means having a plurality of inputs and at least one output for providing an inhibit signal at the output in response to a predetermined signal on at least one of said inputs;
   b. the output of said gate means being connected to said digital system to inhibit the operation of said digital system in response to said inhibit signal;
   c. logic circuitry connected to a plurality of said inputs and to said digital system for receiving the transmitted digital messages and operating to provide said predetermined signal on one of the plurality of said inputs in response to the reception of a spurious digital signal which corresponds with any of the plurality of predetermined, unacceptable digital messages; and
   d. said logic circuitry including further means connected to said digital system for receiving the continuous train of regularly spaced bit timing pulses and providing said predetermined signal on one of the plurality of inputs of said gate means in response to missing bit timing pulses in said continuous train of bit timing pulses.

7. An improved squelch circuit for a digital system designed to receive transmitted digital messages and operate in response thereto, each digital message including transmitted frame timing pulses and bit timing pulses therein, and the digital system internally generating continuous trains of regularly spaced frame and bit timing pulses, synchronized with the received frame and bit timing pulses for correctly decoding transmitted digital messages, said squelch circuit comprising:
   a. gate means having a plurality of inputs and at least one output for providing an inhibit signal at the output in response to a predetermined signal on at least one of said inputs;
   b. the output of said gate means being connected to said digital system to inhibit the operation of said digital system in response to said inhibit signal;
   c. first logic circuitry connected to at least one of the plurality of inputs of said gate means and to said digital system, and including comparing means for receiving the internally generated and the transmitted frame timing pulses and providing said predetermined signal on one of the plurality of inputs in response to missing frame timing pulses and in response to additional frame timing pulses in either of the continuous trains of frame timing pulses; and
   d. second logic circuitry connected to at least one of the plurality of inputs of said gate means and to said digital system, and including comparing means for receiving the internally generated and the transmitted bit timing pulses and providing said predetermined signal on one of the plurality of inputs of said gate means in response to missing bit timing pulses in either of the continuous trains of bit timing pulses.

8. An improved squelch circuit as claimed in claim 7 wherein the comparing means in said first logic circuitry includes a first comparing circuit for comparing internally generated and transmitted frame timing pulses to detect missing frame timing pulses in either of the continuous trains of frame timing pulses and a second comparing circuit for comparing internally generated and transmitted frame timing pulses to detect additional frame timing pulses in either of the continuous trains of frame timing pulses.

* * * * *